July 21, 1936.   L. MONTALTO   2,048,134
ROTARY VALVE GEAR FOR INTERNAL COMBUSTION ENGINES
Filed Jan. 18, 1934    2 Sheets-Sheet 1

Inventor:
LUDOVICO MONTALTO
By Richards & Geier
Attorneys

July 21, 1936.  L. MONTALTO  2,048,134
ROTARY VALVE GEAR FOR INTERNAL COMBUSTION ENGINES
Filed Jan. 18, 1934   2 Sheets-Sheet 2
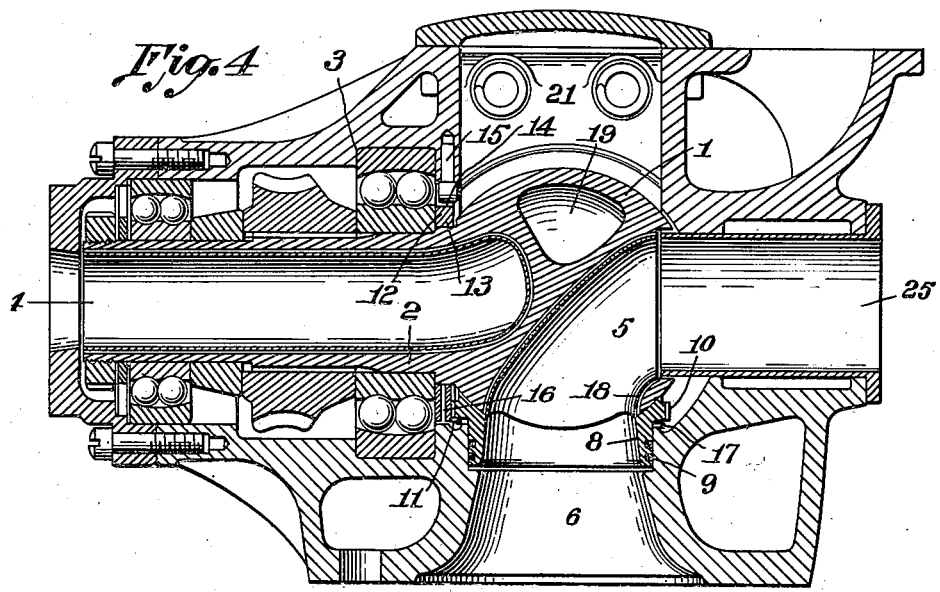
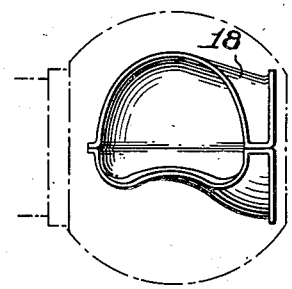
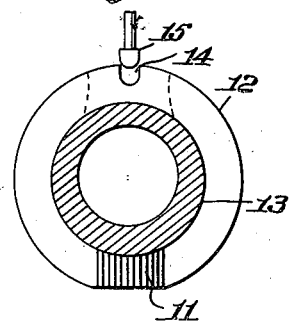
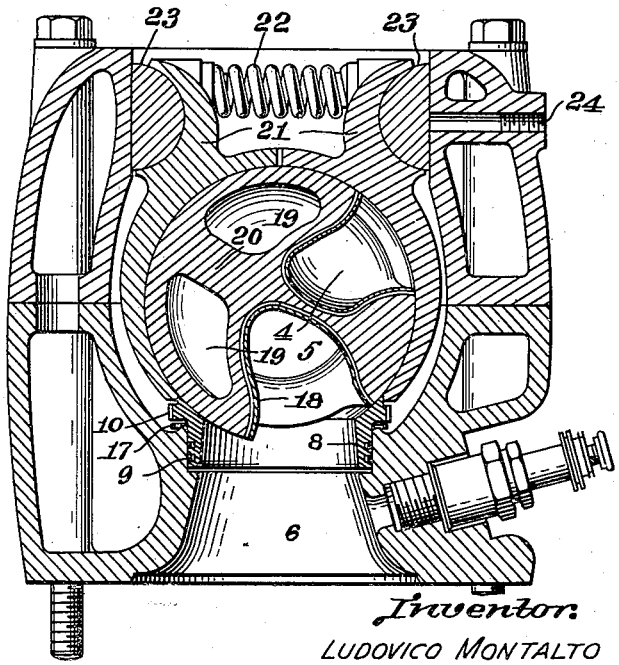
Inventor:
LUDOVICO MONTALTO
By Richards & Geier
Attorneys.

Patented July 21, 1936

2,048,134

UNITED STATES PATENT OFFICE 2,048,134

ROTARY VALVE GEAR FOR INTERNAL COMBUSTION ENGINES

Ludovico Montalto, Fragnito Monforte, Benevento, Italy

Application January 18, 1934, Serial No. 707,157
In Italy January 18, 1933

3 Claims. (Cl. 123—190)

This invention relates to rotary valves of the type comprising a spherical valve member and may be applied to internal combustion engines of all kinds, working on any cycle, either four-stroke or two-stroke, with ordinary induction systems or supercharged, and having one or more cylinders.

The purpose of the valve according to the present invention is, in a general way, the same as that of most rotary valve gears, wherein instead of reciprocating poppet valves a single uniformly rotating valve is used, whereby many advantages of both a thermodynamic and mechanical nature can be achieved.

Difficulties, however, have arisen in many previous designs of rotary valves, mainly on account of their liability to distortion, particularly severe owing to intense heat flow which is usually generated through the valve parts, the temperature gradients which are set up thereby and the differences in temperature which are thus brought about in the various parts of the valve member.

An object of this invention is to overcome defects arising from this source and to comply with all the other requirements of the distribution layout of a high compression power unit.

The above and other objects of the present invention may be realized through the provision of the following means:

The rotary valve, in which the part registering with the combustion chamber has a spherical contour, is rigidly supported by lateral bearings, positively and permanently locating the valve axis.

The casing, which encloses the valve assembly, supplies a rigid housing to said lateral bearings and the central part is made much larger than the spherical portion of the valve, so as to avoid contact with the valve in all circumstances and prevent heat flowing through the valve parts to the casing. In the intervening space, between the casing and the valve, are lodged the gas-sealing device or packing member and the parts provided for cooling the valve; said parts being arranged so as to enable them to register resiliently and continuously with the valve surface.

In order to obtain smooth bearing surfaces, having equal curvatures, so as to provide favorable conditions for securing a gas-seal and a high mechanical efficiency, and also in order to promote an active exchange of heat in a radial direction between the bearing surfaces, the packing member (which is the only part bearing heavily on the valve) is made in the form of an annular ring and is caused to rotate slowly on its axis.

The cooling of the valve is brought about by means of a light shell or container, lodged in the cavity surrounding the valve and registering therewith; this member is made in separate parts in order to bear closely but resiliently on the surface of the valve, notwithstanding valve expansion and wear; it is thus enabled to draw away the heat directly from that part of the surface of the valve which had previously absorbed it.

The invention will appear more clearly from the following detailed description, when taken in connection with the accompanying drawings, illustrating by way of example a rotary valve gear adapted for use with a single cylinder four stroke engine.

In the drawings:

Figs. 4 and 5 are two cross sections of the cylinder head showing a modification of the valve gear.

Fig. 6 is a side view of the exhaust passage insulating sleeve.

Fig. 7 is a cross section through the cylindrical portion of the valve.

Figure 1:
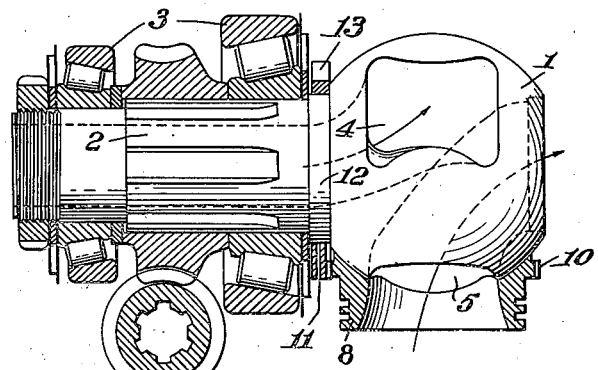
Fig. 1 is a side elevation, partly in section of the valve member, with packing device.

The rotary valve, shown in Fig. 1, is a solid of revolution and is formed by a spherical body 1, rigidly connected to a hollow cylindrical body 2, or stub shaft.

Figure 2:
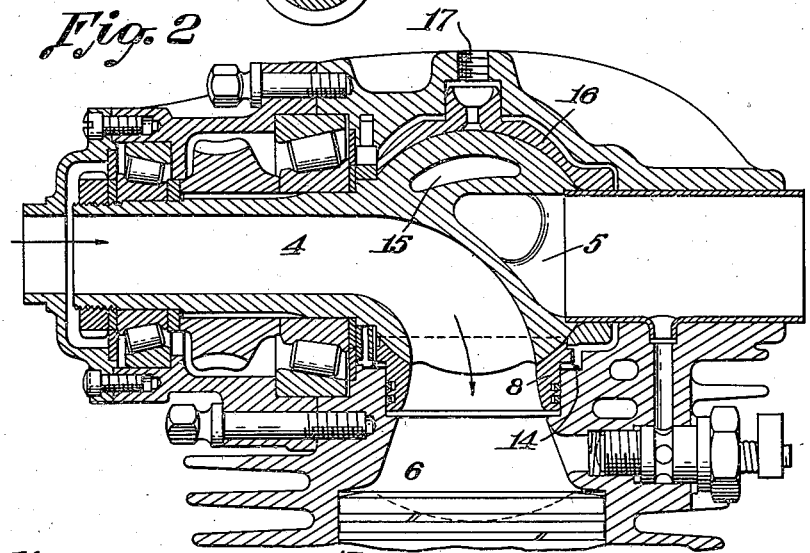
Figs. 2 and 3 are two cross sections through the upper part of a cylinder, the former, on a plane through the axis of the valve, the latter on a plane perpendicular to the valve axis, showing the valve assembly.

The valve is carried by bearings 3, fitted to the cylindrical portion, and the spherical part projects so as to register with the valve port in the combustion chamber 6, shown in Fig. 2. The valve is caused to rotate around its axis of symmetry, with a certain speed ratio and phase relatively to rotation of crank shaft.

The passages, for the delivery of the fresh charge or the air to the combustion chamber, and for discharging the products of combustion, are located in the valve body.

The inlet passage 4 (Figs. 2, 3 and 4) follows the axis of the cylindrical portion of the valve, i. e. it starts at the end of the cylindrical parts 2, and is permanently in communication with the mixing chamber of the carburettor, or the inlet manifold; it passes through the whole length of the cylindrical part of the valve and, on entering the spherical part 1, is bent at right angles to the axis of rotation, so as to reach the outlet port on the spherical surface.

The exhaust passage 5 (Figs. 4 and 1) is much shorter and is essentially an elbow; it comprises a portion which has a practically radial direction (Fig. 4), and another portion having an axial direction and terminating in a round port with the centre on the axis of rotation of the valve and on the opposite side to the cylindrical shaft. This port is permanently in communication with the exhaust tube or manifold.

As the valve rotates the outlet of the induction passage 4 and the inlet of the exhaust passage 5 periodically register with a port, giving access to the combustion chamber 6, through which the inlet and exhaust take place.

Figure 3:
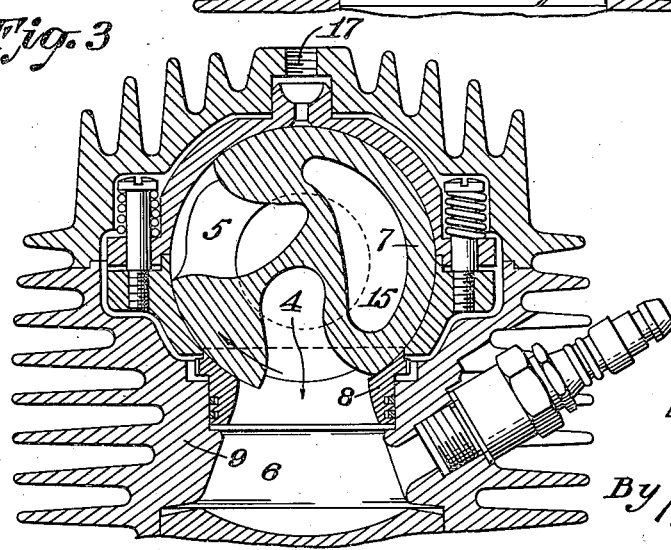

As the valve rotation is positively controlled by the crank shaft, the valve inlet port 4, Fig. 1, moves across the combustion chamber port during the induction stroke; during the following compression and combustion strokes the combustion chamber port is closed by the wider spherical portion 7, Fig. 3, of the valve and finally, during the exhaust stroke, the valve exhaust port registers with the cylinder port.

In order to provide a gas seal between the combustion chamber port and the valve, the former is machined and a packing ring 8 (Figs. 1, 2 and 3) is inserted into it. The upper part of the packing ring 8 is turned and ground to the form of a concave spherical zone and on the outer cylindrical surface two or more grooves are machined in order to lodge ordinary split compression rings 9, as shown in Fig. 3.

The compressed gases in the combustion chamber, which have free access to the inner and lower surface of the packing ring 8, are prevented from escaping along the outer surface of said ring by the piston rings 9 and exert a force on the packing ring, according to their pressure. The vertical component of this force is transmitted by the packing ring to the surface of the valve, thus securing a gas seal.

In order to cause the packing ring to rotate slowly step by step on its axis, a toothed wheel or ratchet 10 (Fig. 1) is cut on a rim, fitted to or, preferably, turned from the ring itself, which meshes with a rack 11, formed on the side of a collar 12 (Fig. 1), bearing on an eccentric race 13 (Fig. 1) on the hollow stub shaft 2 of the valve.

On the outside of the collar 12 and diametrically opposite the rack 11, is a radial slot 14 in which engages a sliding key or a stud 15 (Figs. 2, 4 and 7) in the cylinder head, the effect of the stud being such, that as the hollow shaft 2 rotates, the end of the collar 12 is caused to reciprocate in a plane perpendicular to its axis and in line with the stud 15 and at the same time to oscillate about the stud 15, (owing to the eccentricity of the race 13), whereby the rack 11, engaging the toothed wheel or ratchet 10, and causes the packing ring 8 to rotate slowly.

The movement of the collar 12 (Fig. 1) is timed so as to take place during the induction and the beginning of the compression strokes, i. e. when the forces applied to the ring are slight; the return stroke of the collar does not cause the packing ring to rotate backwards, because of the friction which is created between the ring and its housing.

To enable the collar 12 to complete its return stroke, without causing the packing ring 8 to rotate backwards, the former is split at 16, Fig. 1, in a plane perpendicular to its axis, so as to acquire sufficient elasticity to bend back, so that the teeth of the rack 11 can slip over the teeth of the wheel 10 on the packing ring 8.

Rotation of the packing ring is intended to serve several purposes:

By continually changing about the surfaces in contact, the actions brought about by one surface on the other take place on different portions of the latter and in different directions; thus a scratch produced on one of the bearing surfaces does not develop into a groove.

The rotary movement of the packing ring, which is the only part bearing with considerable pressure on the valve member, around an axis intersecting the axis of the valve, produces moreover, a tendency for the two bearing surfaces, to become spherical, as the abrasive action, slight though it may be, developed by every point of the bearing surfaces, tends to generate precise spherical forms.

When the process of abrasion has been carried on to a sufficient extent, all the points lie on a common sphere.

In order to control the intensity and direction of heat flowing from the packing ring to the valve, in the most convenient manner, to prevent or to control distortion, grooves can be turned on the inner and outer cylindrical surface of the packing ring 8, which grooves can also diminish the rigidity of the packing, so as to enable it to bear with uniform pressure on the surface of the valve, notwithstanding slight irregularities of the latter.

Finally beneath the milled rim 10, Fig. 1, is inserted a spring washer 17, Fig. 2, which exercises a slight upward force on the packing ring, to counteract any tendency of the ring to be withdrawn from the surface of the valve, due to inlet depression or bouncing or the weight of the ring itself.

The mean temperature which the valve reaches in operation depends on the conditions governing heat balance and, to a large extent, on the exchange of heat by convection between the surface of the valve and the gases that sweep across it. Thus, in order to affect this temperature, and keep it within suitable limits, the whole surface of the exhaust passage can be lined by a sheet of smooth, polished, stainless, heat resisting, heat insulating material, enclosed within but not adhering to the metallic mass of the valve.

The lining 18 of the exhaust passage is shown in cross section in Figs. 4 and 5, separated from the mass of the valve by a layer of insulating material (shown by a dotted line); Fig. 6 is a side elevation of said lining, framed in the contour of the valve.

It will be seen in Figs. 4 and 6, that the lining effectively protects the entire surface of the exhaust passage uniformly, from port to port, also providing smooth and streamlined course for the hot gases, thus reducing to a minimum resistance to flow and turbulent heating of the valve.

In a similar manner the interior of the inlet passage 4 (Fig. 4) can be lined with a sheet of material having a high or a low coefficient of heat conductivity, adhering closely to the surface of the valve or thermally insulated from it, according to whether it is considered desirable to lower the temperature of the valve or to promote better volumetric efficiency.

These sheet metal sheaths 18 lining the gas ducts in the valve are preferably formed by joining two sheet metal pressings, as shown in Fig. 6.

In the larger interval between the inlet and the exhaust passage, inside the spherical portion of the valve, a hollow cavity 19 (Figs. 4 and 5) can be left in the casting of the valve, so as to counteract the forces upsetting the rotating balance of the valve, which are introduced by the passages 4 and 5.

Finally, one or more struts or columns 20 (Fig. 5) attached to the central core of the valve and supporting the spherical wall, can supply further means for dissipating heat received by the outer surface of the valve and/or controlling the thermal expansion of the latter.

Conditions determining the heat balance of the valve member according to this invention are completely different from those prevailing in valves of the usual type.

The means provided to reduce distortion and to control wear, i. e. prevention of heat flow through the body of the valve to the casing and continuous rotation of the packing ring, necessarily require that the valve be effectively separated from the casing.

On the other hand, the complete isolation of the valve from the other parts of the assembly, excepting the portion that makes a sliding contact with the packing ring, would necessarily render the means for cooling the valve inadequate.

Rotation of the packing ring obtains that each element of valve surfaces is caused to bear periodically on each element of surface of the packing ring and whilst this circumstance promotes favorable lubricating conditions it also helps to smooth out temperature differences and lessen distortion; nevertheless surface area and thermal capacity of the packing ring are necessarily restricted to level up temperatures of valve parts to a sufficient extent, and its capacity to yield heat to its housing is too limited to cope with the requirements of valve cooling.

For these reasons the spherical shell or container 21, shown in Figs. 3 and 2, 5 and 4, is provided; this part is lodged in the space provided between the valve and the casing and is preferably made in two separate parts, these being made to adhere closely but resiliently to the surface of the valve by means of suitable light springs 22 (Figs. 3 and 5). In the same way that the packing member 8 is enabled to slide in its housing, the parts of the container 21 can close upon the valve as bearing surfaces wear down and move apart when the valve expands.

Contrary to conditions obtaining in valve construction in which the valve bears directly on the casing, the contact between the valve and the parts 21 is uninterrupted and can be extended to that portion of surface which surrounds the packing member.

Consequently heat absorbed by valve surface, particularly by those parts which are periodically swept by burning gases, is yielded to the container, said heat being drawn back from that same portion of valve surface which had previously absorbed it.

In order that the spherical shell or container 16 be entirely relieved of bearing pressure it is free to move along the axis of the packing ring, so that it may follow the expansion and not hinder the elastic movements of the valve (subjected to the varying stress). The inner surface of the shell is machined according to general valve contour, the actual curvature being determined in relation to mean temperatures attained and respective coefficients of thermal expansion of the materials employed.

The container moreover is divided in two separate parts, the dividing plane being either perpendicular to the axis of the packing ring, as shown in Fig. 3, or else turned through 90° along the plane containing the two axes of the valve and the packing ring, as shown in Figs. 4 and 5. A light pressure is applied to the two parts by means of suitable springs 22 (Figs. 3 and 5) so as to maintain the pressure, with which they bear on the valve surface, within close predetermined limits, independently of varying degrees of wear and thermal expansion.

The action of the springs 22, Fig. 3, is such that the two parts of the container 21 are resiliently held together; the arrangement of the parts in Fig. 5 differs since the springs 22 are called upon to achieve two purposes, i. e.: to cause the parts of the container to bear resiliently on the surface of the valve and to press the upper parts of the container outwards, in order to obtain an intimate contact with the jacketed casing, and thus secure good heat conduction.

For the said purpose the parts of the container are extended upwards so as to bear on the semi-cylindrical pads 23 and the compression springs 22, located so that their line of action falls beyond the axis of the semi-cylindrical pads 23, exert a direct force, on the upper part of the container providing favorable heat conduction to the casing and an indirect and less intense force on the lower part, (in the fashion of an inverted lever) in order to cause the container to close resiliently on the surface of the valve.

The purposes that the spherical shell or container serves are the following:

(1) To cover the valve ports, and thus close the passages during the whole period during which the inlet and exhaust strokes are not taking place, thus avoiding exhaust gases being drawn in to the inlet passage at small throttle openings and preventing undue loss of fresh mixture when running at full throttle.

(2) To provide means to promote heat transfer from the hotter to the cooler portions of the valve, thus reducing the liability to distortion.

(3) To draw heat from the valve and transfer it elsewhere, to the detachable head in Figs. 2, and 3 and to a water jacket in water cooled engines, as shown in Fig. 6, in order to cool the valve.

(4) To provide means for supplying lubricant to the valve.

The fact that the spherical shell is caused to register resiliently with the valve member notwithstanding wear and thermal expansion of the parts, provides a suitable and very simple means for delivering oil to the valve under pressure; the quantity of oil discharged being regulated by varying the pressure.

As shown in Figs. 3 and 5, lubricant can be led by means of a pipe and union to a threaded hole 24; it should be pointed out, however, that the holes 24 are shown, for the sake of convenience, with their axes lying on the equatorial plane of the valve, but that it is convenient to locate them laterally, so as to deliver oil to the valve, aside of the path followed by the valve port bores, (as the valve rotates) in order to avoid waste of lubricant.

Finally a method devised to prevent loss of lubricating oil through the exhaust tube is shown in Figs. 5 and 2, wherein a sleeve 25 communicating with the exhaust tube registers with an enlargement of the outlet of the valve exhaust passage 5.

What I claim is:

1. In internal combustion engines, a rotary valve comprising a portion of spherical contour with inlet and exhaust ports, registering in timed relation with the combustion chamber, means for rotating said valve consisting of a lateral portion rigidly connected with the first-mentioned spherical portion; bearings supporting the second-mentioned portion, a casing, enclosing the valve assembly, means bearing resiliently on the valve and situated within the space between the valve and the casing, said means securing a gas seal, and providing for the cooling of the valve, a packing member of the annular ring type and means for rotating said packing member about its axis, intersecting the axis of the valve, in order to control wear.

2. The combination of a spherical rotary valve according to claim 1, said rigid lateral portion for rotating said valve comprising an eccentric race; a collar co-operating with said race and having a rack; a toothed wheel on the packing ring engaging said rack; means to cause the collar to oscillate, as the valve shaft rotates, and to transmit a step by step rotary movement in one direction to the packing ring.

3. The combination of a rotary valve supported by lateral bearing according to claim 1, said resiliently bearing member consisting of an outer container shell for the valve and situated in a cavity formed in the valve casing; said container being free to slide in the valve casing along the axis of the cylinder port and consisting of two separate parts; springs provided on said parts ensuring a constant light pressure between the container and the valve, and means for preventing the parts of said shell from rotating together with the valve.

LUDOVICO MONTALTO.